United States Patent
Blokland et al.

(10) Patent No.: US 9,482,557 B2
(45) Date of Patent: Nov. 1, 2016

(54) SENSOR UNIT FOR SENSING AN ANGULAR POSITION OF A ROTATING ELEMENT WITH RESPECT TO A FIXED ELEMENT AND BEARING ASSEMBLY COMPRISING SUCH A SENSOR UNIT

(75) Inventors: Susanne Blokland, Ann Arbor, MI (US); Stephane Moisy, L'lle-Bouchard (FR); Vincent Sausset, Azay-le-Rideau (FR)

(73) Assignee: AKTIEBOLAGET SKF, Gothenburg (SE)

( * ) Notice: Subject to any disclaimer, the term of this patent is extended or adjusted under 35 U.S.C. 154(b) by 65 days.

(21) Appl. No.: 14/384,181

(22) PCT Filed: Mar. 7, 2012

(86) PCT No.: PCT/IB2012/000599
§ 371 (c)(1),
(2), (4) Date: Sep. 10, 2014

(87) PCT Pub. No.: WO2013/132283
PCT Pub. Date: Sep. 12, 2013

(65) Prior Publication Data
US 2015/0192430 A1   Jul. 9, 2015

(51) Int. Cl.
*G01D 5/12* (2006.01)
*G01D 5/244* (2006.01)
*G01D 11/24* (2006.01)
*H01R 12/58* (2011.01)
*H01R 9/03* (2006.01)
*F16C 41/00* (2006.01)

(52) U.S. Cl.
CPC ............... *G01D 5/12* (2013.01); *G01D 5/244* (2013.01); *G01D 11/245* (2013.01); *H01R 12/585* (2013.01); *F16C 41/007* (2013.01); *H01R 9/03* (2013.01)

(58) Field of Classification Search
CPC ...... G01D 5/244; G01D 11/245; G01D 5/12; F16C 41/007; H01R 12/585; H01R 9/03; G01B 7/30
USPC ............ 324/173–174, 207.2, 207.21, 207.25
See application file for complete search history.

(56) References Cited

U.S. PATENT DOCUMENTS

| | | |
|---|---|---|
| 2004/0092154 A1 | 5/2004 | Doorhy et al. |
| 2009/0206827 A1 | 8/2009 | Aimuta et al. |
| 2014/0045390 A1* | 2/2014 | Wittig .................. H01R 12/585 439/825 |

FOREIGN PATENT DOCUMENTS

DE          10222324 A1    11/2003

* cited by examiner

*Primary Examiner* — Jay Patidar
(74) *Attorney, Agent, or Firm* — Bryan Peckjian; SKF USA Inc. Patent Dept.

(57) ABSTRACT

A sensor unit for sensing the angular position of a rotating element with respect to a fixed element includes a target fastened to the rotating element and a given number of sensing cells. Each sensing cell is connected to a connection device adapted to provide power supply, transmit data delivered by the sensing cells and connect each sensing cell to the ground. The sensor unit provides an output connector for electrically connecting the sensor unit to a reception device, a power supply system and the ground, via a connection cable having at least two connection wires. The connector includes, for each wire of the connection cable, a connection pin having a clamp portion adapted to receive an end of the wire, and a plug portion adapted to make a pressing contact with the connection device.

14 Claims, 4 Drawing Sheets

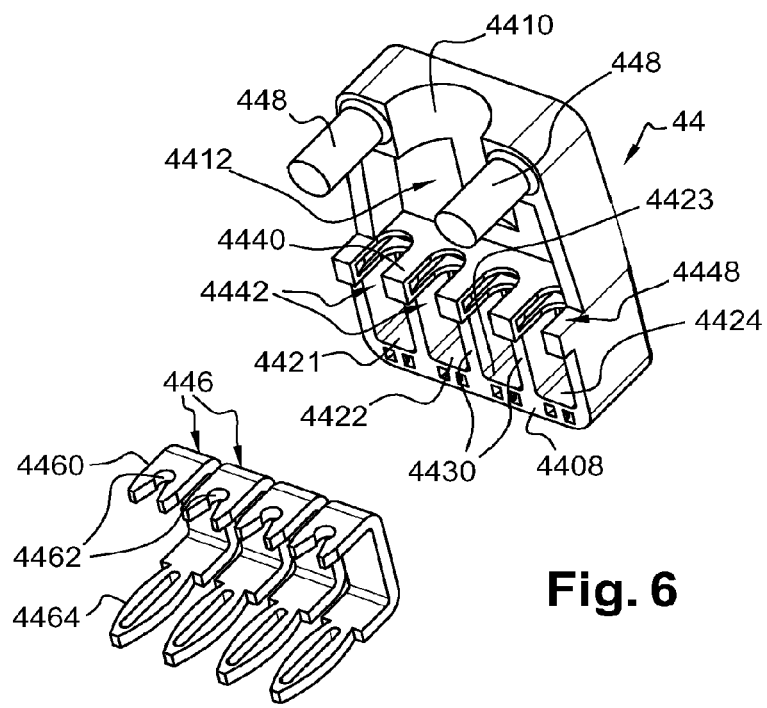
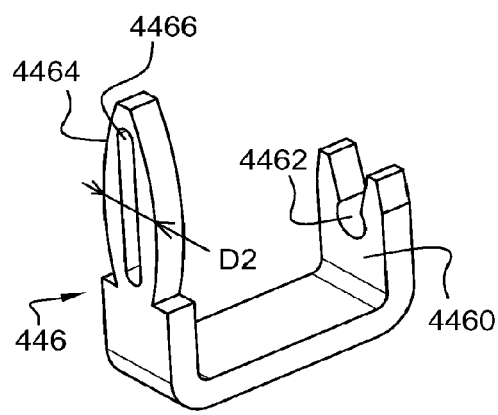
Fig. 6
Fig. 7
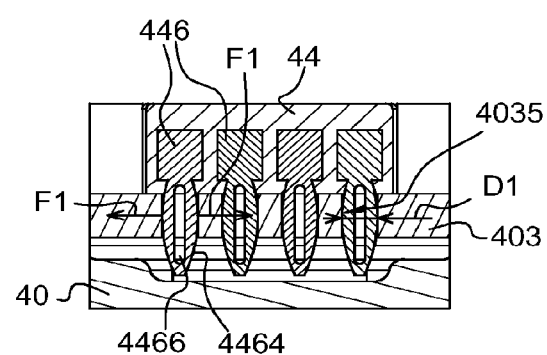
Fig. 8

SENSOR UNIT FOR SENSING AN ANGULAR POSITION OF A ROTATING ELEMENT WITH RESPECT TO A FIXED ELEMENT AND BEARING ASSEMBLY COMPRISING SUCH A SENSOR UNIT

CROSS REFERENCE TO RELATED APPLICATION

This is a National Stage application claiming the benefit of International Application Number PCT/M2012/000599 filed on 7 Mar. 2012, which is herein incorporated by reference in its entirety.

TECHNICAL FIELD OF THE INVENTION

The invention relates to a sensor unit for sensing the angular position of a rotating element with respect to a fixed element. The invention also concerns a bearing assembly comprising such a sensor unit.

BACKGROUND OF THE INVENTION

Bearing assemblies are regularly equipped with a sensor unit for determining angular positions and rotation speeds. These sensor units need an electrical power supply, a connection to the ground and must be able to send output signals to a reception device, such as a dashboard of a vehicle on which the bearing assembly is mounted. The electrical connections are often realized by using a cable comprising several electrical wires connected to the sensor unit to perform the above-mentioned functions. This implies that several electrical connections need to be made when mounting the sensor unit. These connections are generally performed by soldering, which makes the mounting operations relatively long and costly.

SUMMARY OF THE INVENTION

The aim of the invention is to provide a new sensor unit whose output connection is simpler and easier than in the prior art.

To this end, the invention concerns a sensor unit for sensing the angular position of a rotating element with respect to a fixed element, the sensor unit comprising a target fast in rotation with the rotating element and a given number of sensing cells, each sensing cell being connected to a connection device adapted to provide power supply, transmit data delivered by the sensing cells and connect each sensing cell to the ground, the sensor unit comprising an output connector for electrically connecting the sensor unit to a reception device, to a power supply system and to the ground, via a connection cable comprising at least two electrical wires. This sensor unit is characterized in that the connector comprises, for each wire of the connection cable, a connection pin having a clamp portion adapted to receive an end of said wire, and a plug portion adapted to make a pressing contact with the connection device.

The present general inventive concept allows the sensor unit can be connected to a reception device, a power supply system and the ground simply by plugging an output connector which makes the electrical connection based on mechanical forces exerted by plug portions of connection pins. This avoids welding or soldering steps and reduces the mounting cost of the sensor unit.

According to further aspects of the invention which are advantageous but not compulsory, such a sensor unit may incorporate one of the following features:

Each clamp portion has a hole through which the end of a wire is inserted.
The plug portion has an oval shape adapted to be inserted into a plug area of the connection device.
Each plug portion comprises a longitudinal slot, which allows said plug portion to elastically deform.
The plug areas of the connection device are circular holes.
The diameter of the circular holes is inferior to the transversal dimension of the unstressed plug portions of the connection pins.
The connection device is an annular printed circuit board.
The output connector is made of plastic material.
The connection pins are overmoulded within the output connector.
The connection pins are mounted in the output connector after its manufacturing.
The output connector is fixed to a sensor body in which the sensing cells and the connection device are mounted by snapping.
The output connector comprises at least one radial holding stop oriented opposite to the rotation axis of the rotating element, and adapted to cooperate with a surface of the sensor body.

The invention also concerns a bearing assembly comprising a bearing and a sensor unit as mentioned here above.

BRIEF DESCRIPTION OF THE DRAWINGS

The invention will now be explained in correspondence with the annexed figures, as an illustrative example. In the annexed figures:

FIG. 6 is an exploded perspective view of the output connector of FIGS. 4 and 5;

FIG. 7 is a perspective view of a connection pin belonging to the output connector of FIG. 6.

FIG. 8 is a sectional view, along plane VIII in FIG. 5, of the output connector and sensor body of FIG. 5.

DETAILED DESCRIPTION OF SOME EMBODIMENTS

Figure 1:
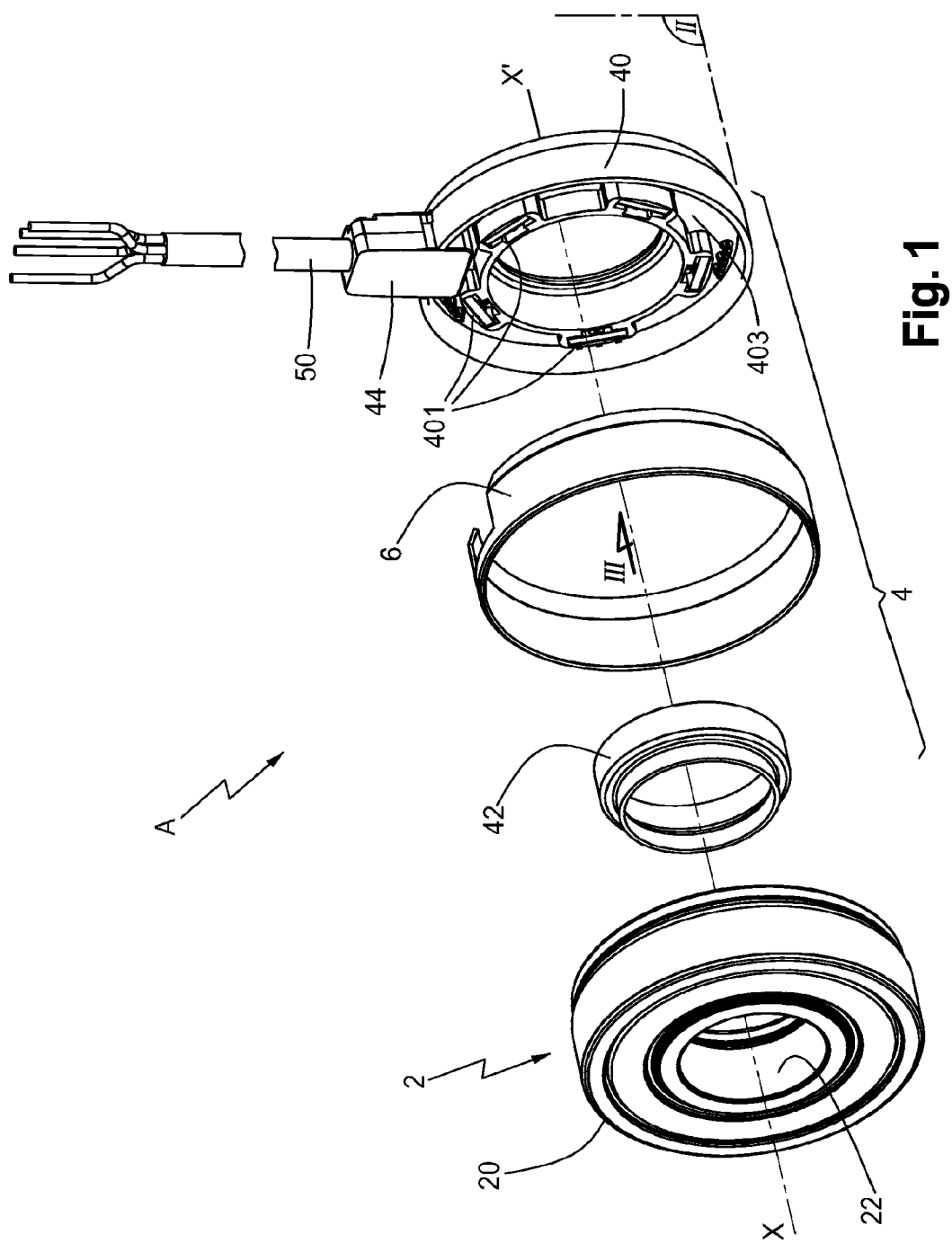
FIG. 1 is a partially exploded perspective view of a bearing assembly according to the invention.
Figure 2:
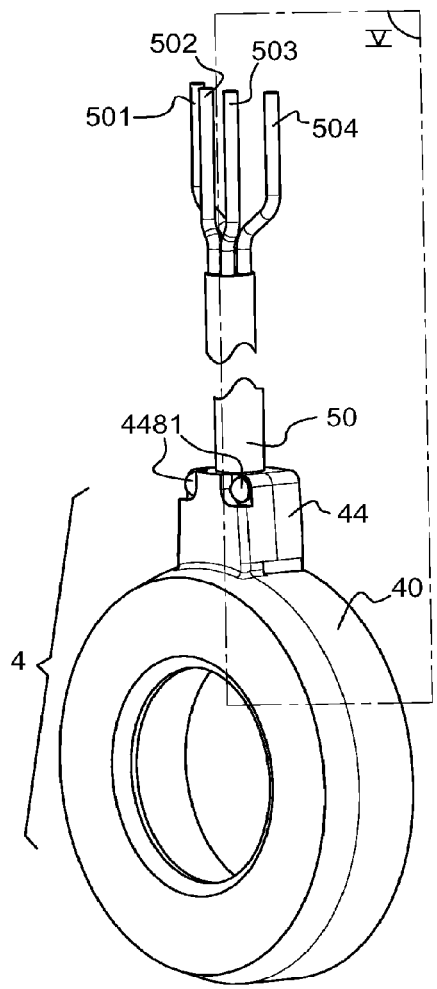
FIG. 2 is a perspective view of a sensor unit according to the invention, which belongs to the assembly of FIG. 1.
Figure 3:
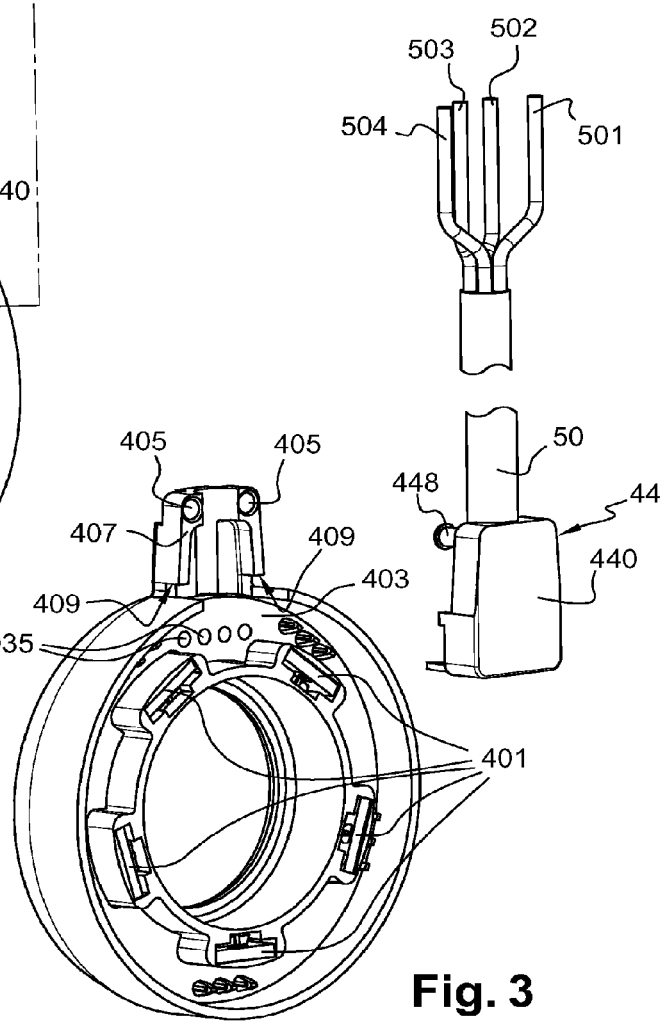
FIG. 3 is a partially exploded perspective view of the sensor unit of FIG. 2, from a different angle.
Figure 4:
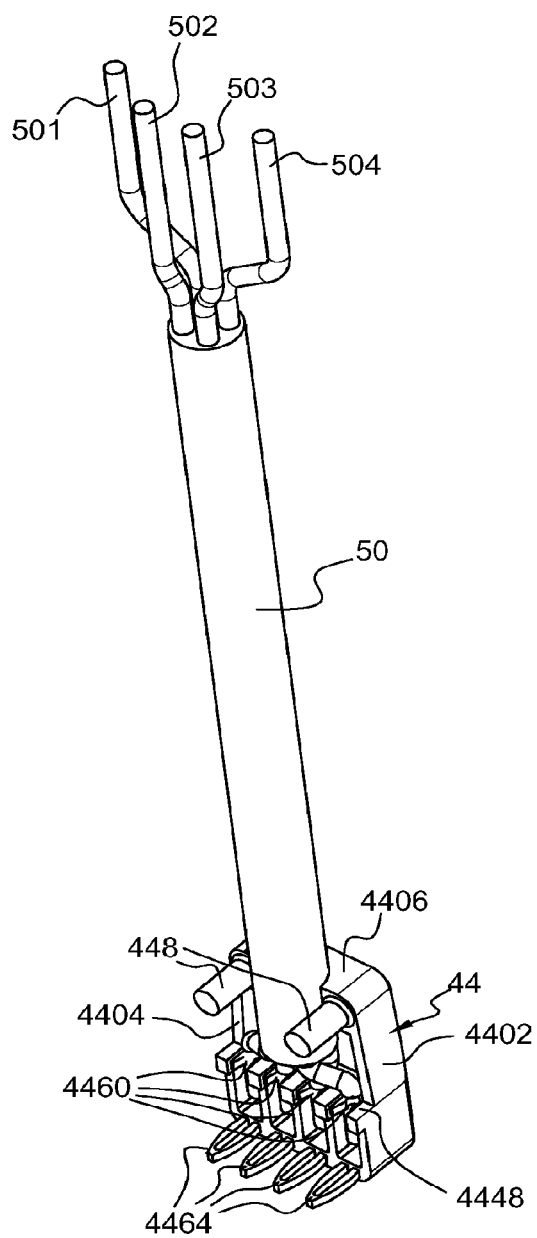
FIG. 4 is a perspective view of an output connector and a connection cable belonging to the sensor unit of FIGS. 2 and 3.
Figure 5:
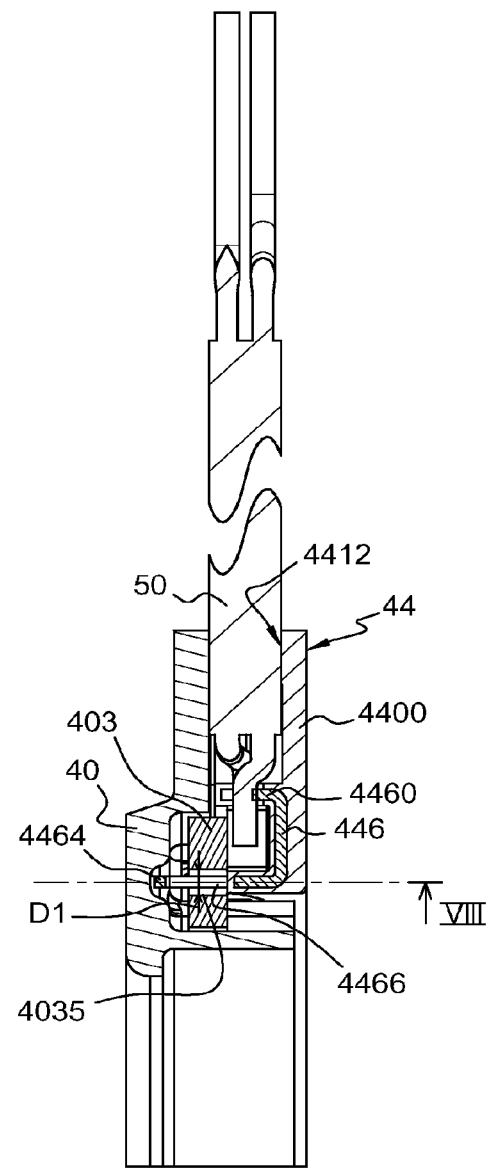
FIG. 5 is a sectional view along plane V in FIG. 2, of the output connector and connection cable of FIG. 4, connected to a sensor body.

The rolling bearing assembly A represented on FIG. 1 comprises a rolling bearing 2 including an outer ring 20, an inner ring 22 and non-shown rolling elements, such as balls, rollers or needles.

Assembly A further comprises a sensor unit 4 including a sensor body 40 made of plastic material and adapted to be fixed to outer ring 20 using a fastening flange 6. Sensor unit 4 also includes a coder element or target 42 to correspondingly rotate with inner ring 22. Axis X-X' denotes the rotation axis of inner ring 22 with respect to outer ring 20, and also the rotation axis of coder element 42 with respect to sensor body 40. Several sensing cells 401 integrated into sensor body 40 are adapted to sense the angular position of target 42 so as to determine the angular position and/or the rotation speed of inner ring 22 with respect to outer ring 20.

Sensing cells 401 are regularly distributed around the rotation axis X-X' of target 42. Target 42 may be a multi-pole magnetized ring which produces magnetic field variations while rotating around axis X-X'. Such magnetic field variations are sensed by sensing cells 401, which may be Hall-effect sensing cells. Sensing cells 401 are arranged so as to radially face target 42 with respect to axis X-X'.

Sensor unit 4 comprises an electrical connection device which makes the electrical connection between sensing cells 401 and an output of sensor unit 4. The output comprises a connector 44 (a.k.a., an output connector 44), and a connection cable 50 for transmitting output signals to a reception device, for example a dashboard, and providing electrical power and connection to the ground. In the present case, connection cable 50 comprises four electrical wires respectively referenced 501, 502, 503 and 504, which respectively perform the following functions:

electrical connection of sensing cells 401 to a non-represented power supply,
electrical connection of sensing cells 401 to the ground,
transmission of a sine output electrical signal,
transmission of a cosine output electrical signal.

Sine and cosine output electrical signals are representative of the rotation speed and angular position of inner ring 22 with respect to outer ring 20. They are generated by signal processing means on the basis of the data sensed by sensing cells 401. In the present case, the connection device is a printed circuit board 403 which includes the signal processing means and which is adapted to acquire the data, i.e. electrical currents delivered by each sensing cell 401.

Output connector 44 comprises a connector body 440, preferably made of plastic material. Connector body 440 has a substantially hollow parallelepiped shape. Body 440 comprises a bottom wall 4400, side walls 4402 and 4404 which are substantially perpendicular to bottom wall 4400, a rear wall 4406 and a front wall 4408. Rear wall 4406 and front wall 4408 are opposed to each other and join side walls 4402 and 4404. Rear wall 4406 comprises a circular slot 4410 through which connection cable 50 is inserted inside connector body 440. Connection cable 50 is adapted to lay against an inner surface 4412 of bottom wall 4400.

To receive each of the wires 501, 502, 503 and 504 of cable 50, connector body 440 comprises four housings 4421, 4422, 4423 and 4424. These housings are separated using three ribs 4430 which extend from front wall 4408 and bottom wall 4400. Housings 4421 to 4424 have a substantially parallelepiped shape and have, on their end oriented towards rear wall 4406, a transversal wall 4440 substantially parallel to rear wall 4406. Transversal wall 4440 comprises four openings 4442 through which wires 501 to 504 are respectively inserted into housings 4421 to 4424.

Connector 44 comprises, for each wire 501 to 504, a connection pin 446 adapted to perform the electrical connection between one of wires 501 to 504 and printed circuit board 403.

Connector 44 comprises four connection pins 446, which are preferably made from stamped and folded metallic sheets. Connection pins 446 are preferably overmolded within output connector 44. Alternatively, connection pins 446 may be mounted in output connector 44 after its manufacturing. A clamp portion 4460 of each connection pin 446 protrudes in one of openings 4442 and has a shape adapted to keep a wire fixed to connector 44. To this end, each clamp portion 4460 has a central hole 4462 through which one of wires 501 to 504 is inserted. The diameter of holes 4462 is preferably slightly inferior to the diameter of wires 501 to 504.

Each connection pin 446 comprises a plug portion 4464 adapted to be connected to printed circuit board 403. Plug portion 4464 shows a sensibly oval shape with a central longitudinal slot 4466. This central slot 4466 allows plug portion 4464 to elastically deform under compression forces exerted perpendicularly to slot 4466.

Printed circuit board 403 comprises four circular holes 4035 which are adapted to receive plug portions 4464 of connector 44. Holes 4035 have a diameter D1 slightly inferior to the transversal dimension D2, perpendicularly to central slot 4466, of unstressed plug portions 4464. When plug portions 4464 are inserted in holes 4035, holes 4035 exert a compression force on plug portions 4464. As plug portions 4464 are able to elastically deform, elastic forces F1, represented on FIG. 8, are exerted perpendicularly to slots 4466 on holes 4035, and guarantee an electrical pressing contact between connection pins 446 and printed circuit board 403. This mounting avoids long and costly welding or soldering steps.

In the same way, holes 4462 of clamp portions 4460 is adapted to retain wires 501 to 504 in housings 4421 to 4424. This avoids the use of welding or soldering operations to fast wires 501 to 504 to connector 44.

Connector 44 comprises mounting studs 448 which extend perpendicularly to bottom wall 440 at the intersection between rear wall 4406 and side walls 4402 and 4404. Mounting studs 448 are adapted to be inserted into two corresponding holes 405 of sensor body 40, so as to protrude from holes 405. Connector 44 is fixed to sensor body 40 by snapping the end 4481 of mounting studs 448 on a side of holes 405 opposed to a mounting surface 407 adapted to cooperate with walls 4402, 4404, 4406 and 4408.

Side walls 4402 and 4404 comprise radial holding stops 4448 which are oriented opposite from axis X-X'. Stops 4448 are adapted to come into abutment against corresponding surfaces 409 of sensor body 40 which are oriented towards axis X-X'. The cooperation between surfaces 409 and stops 4448 guarantees the radial holding of collector 44 on sensor body 40.

What is claimed is:

1. A sensor unit for sensing the angular position of a rotating element with respect to a fixed element, the sensor unit comprising:
   a target fastened to the rotating element and a given number of sensing cells, each sensing cell being connected to a connection device to provide power supply, transmit data delivered by the sensing cells and connect each sensing cell to the ground,
   an output connector for electrically connecting the sensor unit to a reception device,
   a power supply system and the ground, via a connection cable providing at least two connection wires, wherein the output connector includes, for each wire of the connection cable, a connection pin having a clamp portion to receive an end of the wire, and a plug portion to make a pressing contact with the connection device.

2. A sensor unit according to claim 1, wherein each clamp portion has a hole through which the end of a wire is inserted.

3. A sensor unit according to claim 1, wherein the plug portion has an oval shape to be inserted into a plug area of the connection device.

4. A sensor unit according to claim 3, wherein each plug portion has a longitudinal slot, which allows the plug portion to elastically deform.

5. A sensor unit according to claim 3, wherein the plug areas of the connection device are circular holes.

6. A sensor unit according to claim 5, wherein the diameter (D1) of the circular holes is less than the transversal dimension (D2) of a plurality of unstressed plug portions of the connection pins.

7. A sensor unit according to claim 1, wherein the connection device is an annular printed circuit board.

8. A sensor unit according to claim 1, wherein the output connector is made of plastic material.

9. A sensor unit according to claim 8, wherein the connection pins are overmolded within the output connector.

10. A sensor unit according to claim 8, wherein the connection pins are mounted in the output connector after its manufacturing.

11. A sensor unit according to claim 1, wherein the output connector is fixed to a sensor body in which the sensing cells and the connection device are mounted by snapping.

12. A sensor unit according to claim 11, wherein the output connector includes at least one radial holding stop oriented opposite to the rotation axis (X-X') of the rotating element, and to correspond to a surface of the sensor body.

13. A sensor unit according to claim 1, wherein an opening of the clamp portion corresponds to a direction the plug portion inserts into the connection device.

14. A bearing assembly comprising:
a bearing and
a sensor unit having;
a target fastened to a rotating element and a given number of sensing cells, each sensing cell being connected to a connection device to provide power supply, transmit data delivered by the sensing cells and connect each sensing cell to the ground,
an output connector for electrically connecting the sensor unit to a reception device,
a power supply system and the ground, via a connection cable providing at least two connection wires, wherein
the connector includes, for each wire of the connection cable, a connection pin having a clamp portion to receive an end of the wire, and a plug portion to make a pressing contact with the connection device.

* * * * *